(12) United States Patent
Usui et al.

(10) Patent No.: US 6,704,014 B2
(45) Date of Patent: Mar. 9, 2004

(54) METHOD OF DISPLAYING VELOCITIES AND PRESSURES IN DISPLAY DEVICE FOR INJECTION MOLDING

(75) Inventors: Kazuo Usui, Nagano-Ken (JP); Chiharu Nishizawa, Nagano-Ken (JP)

(73) Assignee: Nissei Plastic Industrial Co., Ltd., Nagano-Ken (JP)

( * ) Notice: Subject to any disclaimer, the term of this patent is extended or adjusted under 35 U.S.C. 154(b) by 233 days.

(21) Appl. No.: 09/864,002

(22) Filed: May 23, 2001

(65) Prior Publication Data

US 2002/0054041 A1 May 9, 2002

(30) Foreign Application Priority Data

May 25, 2000 (JP) ........................................ 2000-154817

(51) Int. Cl.⁷ ............................................... G06T 11/20
(52) U.S. Cl. .................. 345/440; 345/440.1; 345/440.2
(58) Field of Search .............................. 345/440, 440.1, 345/440.2

(56) References Cited

U.S. PATENT DOCUMENTS 5,213,726 A * 5/1993 Ramsey et al. ............ 264/40.5

* cited by examiner

Primary Examiner—Matthew C. Bella
Assistant Examiner—Tam Tran
(74) Attorney, Agent, or Firm—Weingarten, Schurgin, Gagnebin & Lebovici

(57) ABSTRACT

By providing a V-P switchover point on a time axis display screen as well, waveforms of measured pressures prior and subsequent to V-P switchover shall be continuously displayed, thereby making it easy to ascertain the state of pressures at the V-P switchover point. A time axis display screen 4 for displaying velocities and/or pressures with a horizontal axis as a time scale; and a position axis display screen 5 for displaying velocities and/or pressures with a horizontal axis as a position scale; are provided side by side on a display panel surface along with fields for various numerical values established as molding conditions. A V-P switchover point is displayed as a vertical axis in each of time axis display screen 4 and of the position axis display screen 5. The time axis display screen 4 is divided into a left-hand screen portion 4a and a right-hand screen portion 4b by the vertical axis representing the V-P switchover point; and the state of velocities and pressures subsequent to V-P switchover is continuously displayed as waveforms on time axis display screen, starting at a time prior to V-P switchover.

2 Claims, 3 Drawing Sheets

METHOD OF DISPLAYING VELOCITIES AND PRESSURES IN DISPLAY DEVICE FOR INJECTION MOLDING

BACKGROUND OF THE INVENTION

1. Field of the Invention

The present invention relates to a method of displaying velocities and pressures in a display device for injection molding, wherein the state of injection velocities and injection pressures of a resin material is displayed as waveforms along with conditions established for injection molding.

2. Detailed Description of the Prior Art

As one of the prior art methods of displaying velocities and pressures, a method is known wherein a display screen is divided into a left-hand portion and a right-hand portion by a vertical axis disposed at the center of the display screen, the left-hand portion of the display screen serves as a time axis display screen having a time scale, the right-hand portion of the display screen serves as a position axis display screen having a position scale, the above-mentioned vertical axis disposed at the center of the display screen serves as a line of demarcation representing a pressure-holding switchover point, velocities and/or pressures produced in conjunction with the shifting of positions of an injection screw are displayed during a filling process, and velocities and/or pressures produced in conjunction with the lapse of time are graphically displayed during a pressure-holding process.

In the case of the method of display mentioned immediately above:

during the injection process, velocities and/or pressures which are produced as the injection screw travels forward from the extreme right of the position axis display screen to the pressure-holding switchover point thereon can be continuously displayed as waveforms; and during the pressure-holding process, velocities and/or pressures which are produced as time elapses from the initiation of pressure-holding to the completion thereof, the point of the above-mentioned completion being locates at the extreme left of the time axis display screen.

subsequent to pressure-holding switchover, velocities and/or pressures produced in conjunction with the forward travel of the injection screw from the pressure-holding switchover point to the pressure-holding completion point cannot be displayed, since no display is carried out by means of the position scale.

Normally, switchover from injection to pressure-holding is carried out at a position short of the mechanical forward travel limit of the injection screw. Even after the above-mentioned switchover takes place, the injection screw moves in response to pressure-holding switchover and contraction of resin injected into and filled inside a cavity, the above-mentioned contraction being caused by cooling. Even subsequent to the above-mentioned switchover, it is regarded as necessary that velocities and pressures be displayed by means of a position scale up to the position at which pressure-holding is completed, in order that changes in velocities and pressures in the early stage of pressure-holding may be ascertained, thereby carrying out injection without any trouble.

This being so, in the case of a new prior art method:

the display screen is divided into a left-hand portion and a right-hand portion with the screw forward travel limit as the borderline, the left-hand portion serving as a time axis display screen, the right-hand portion serving as a position axis display screen;

velocities and/or pressures during a pressure-holding process are displayed as waveforms on the time axis display screen, with the screw forward travel limit as the pressure-holding initiation point;

the pressure-holding switchover point is displayed on the position axis display screen, at a position short of the screw forward travel limit point; and as a consequence, even velocities and/or pressures produced subsequent to holding-pressure switchover can be displayed as waveforms by means of a position scale.

However, in the case of this new prior art method, velocities and/or pressures on the time axis display screen are displayed with the screw forward travel limit point as the pressure-holding initiation point. Therefore, the velocities and/or pressures as displayed on the time axis display screen are limited to those produced subsequent to the initiation of pressure-holding, and thus the state of current pressures as they were prior to the initiation of pressure-holding cannot be displayed as waveforms on the time axis display screen. This being so, the state of current pressures as they were prior to the initiation of pressure-holding is confirmed through observation of current pressures as they were in a range short of the pressure-holding point on the position axis display screen.

To sum up, the problems with prior art methods are as follows.

If the arrangement is such that velocities and/or pressures are continuously displayed as waveforms both on the position scale and on the time scale, then velocities and/or pressures produced between the holding-pressure switchover point and a point subsequent to the completion of holding-pressure cannot be displayed as waveforms by means of the position scale.

And if the holding-pressure switchover point is displayed at a position short of the screw forward travel limit with the aim of enabling the above, then the continuity of waveforms as displayed is lost, thus rendering it difficult to ascertain the state of pressures as they are prior and subsequent to the initiation of pressure holding.

A holding-pressure switchover point is generally defined as a control point at which filling velocity control performed so far is switched over to pressure control. Since a holding-pressure switchover point is essentially a point at which velocity control is switched over to pressure control, the above-mentioned control point is referred as a V-P switchover point in the present invention. Smooth operation is required at this V-P switchover point, and it is regarded as undesirable from the viewpoint of stable molding if any drastic pressure or velocity is present at the V-P switchover point.

SUMMARY OF THE INVENTION

The present invention was contrived with the aim of solving the above-mentioned problems with prior art methods. It is an object of the present invention to provide a new method of displaying velocities and pressures in a display device for injection molding, wherein by displaying a V-P switchover point as a vertical axis in each of a position axis display screen and of a time axis display screen, not only can velocities and pressures subsequent to V-P switchover be displayed as waveforms on the position axis display screen, but also the state of velocities and pressures prior to V-P switchover can be displayed as waveforms on the time axis display screen.

The present invention, whose object is as described above, comprises:

a time axis display screen for displaying velocities and/or pressures with a horizontal axis as a time scale; and a position axis display screen for displaying velocities and/or pressures with a horizontal axis as a position scale;

the above-mentioned time axis display screen and the above-mentioned position axis display screen being disposed side by side on a display panel surface along with fields for various numerical values established as molding conditions: wherein a V-P switchover point is displayed as a vertical axis in each of the above-mentioned position axis display screen and of the above-mentioned time axis display screen;

the above-mentioned time axis display screen is divided into a left-hand portion and a right-hand portion by the vertical axis representing the above-mentioned V-P switchover point;

the state of velocities and pressures subsequent to V-P switchover is continuously displayed as waveforms on the above-mentioned time axis display screen, starting at a time prior to V-P switchover; and the ratio at which the above-mentioned time axis display screen is divided by the above-mentioned vertical axis representing V-P switchover point can be changed arbitrarily.

DETAILED DESCRIPTION OF THE PREFERRED EMBODIMENT

Figure 1:
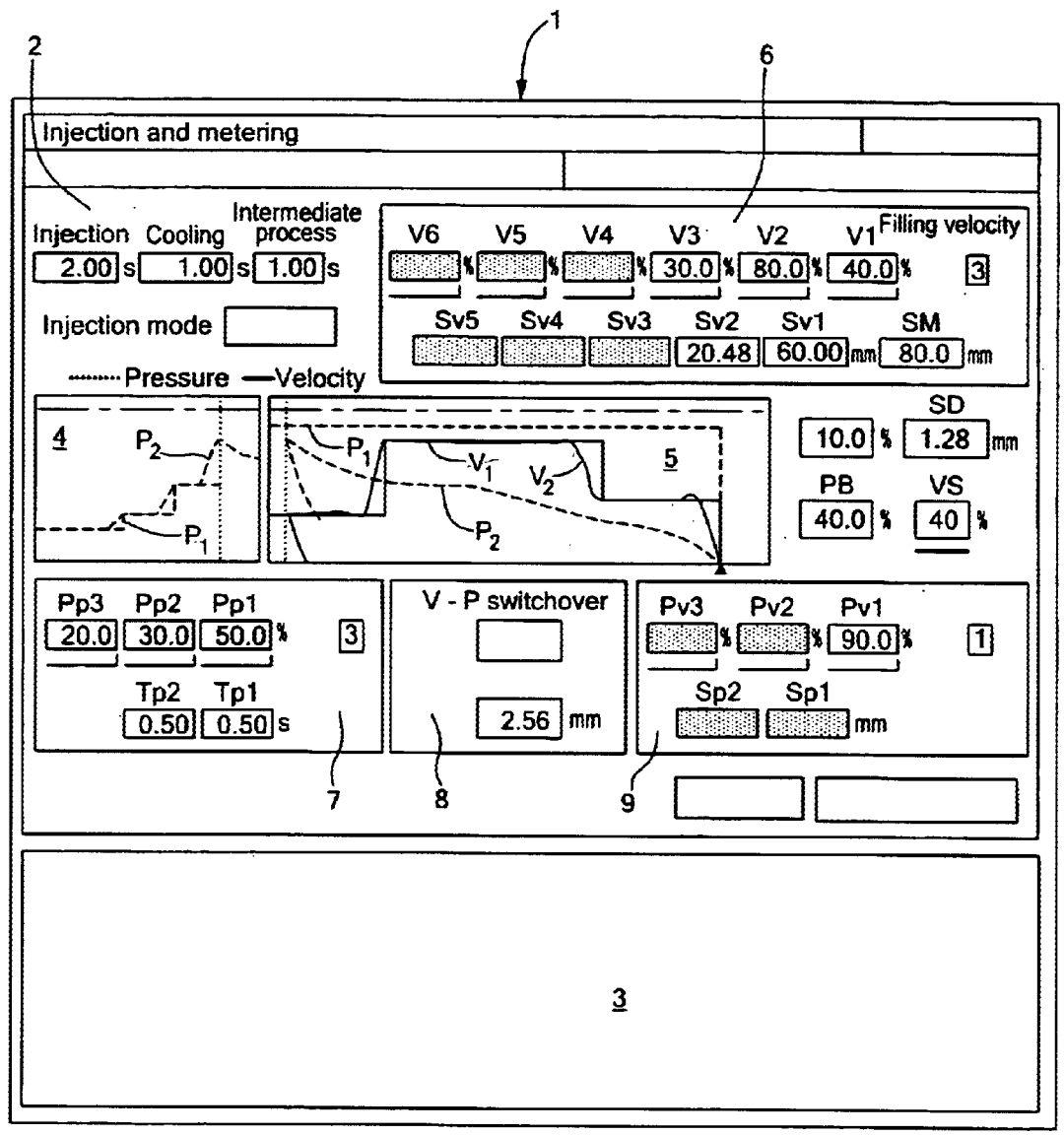
FIG. 1 a front view of a display panel which is provided with display screens for velocities and pressures in such a way as to enable the present invention to be carried out.

FIG. 1 shows a display panel for a display device for injection molding, wherein are provided a display screen 2 made of color liquid crystal and a key operating portion 3 provided underneath the above-mentioned display screen 2.

The above-mentioned display screen 2 comprises:

a time axis display screen 4 for displaying a pressure-holding process, with a horizontal axis as a time scale; and a position display screen 5 for displaying an injection process, with a horizontal scale as a position scale;

the above-mentioned time axis display screen 4 and the above-mentioned position axis display screen 5 being disposed side by side, the former being at left and the latter being at right, along with numerical value fields such as a filling velocity field 6, a pressure-holding field 7, a V-P switchover position field 8, and a limit pressure field 9.

The above-mentioned time axis display screen 4 and the above-mentioned position axis display screen 5 are so set as to display velocities and/or pressures as waveforms depending on quantities which are intended to be displayed. In the case of the embodiment shown in the drawings, velocities and pressures during injection forming are intended to be displayed. Therefore, for purposes of explanation, the time axis display screen 4 displays only set pressures $P_1$ and measured pressures $P_2$, and the position axis display screen 5 displays not only set pressures $P_1$ and measured pressures $P_2$ but also set velocities $V_1$ and measured velocities $V_2$.

The symbol H on any screen denotes a line representing 100% velocity or 100% pressure as applicable.

In each of the above-mentioned time axis display screen 4 and of the above-mentioned position axis display screen 5, a V-P switchover point is displayed as a vertical axis on the screen. As regards the V-P switchover point in the position axis display screen 5, the vertical axis is displayed, just as in the case of the prior art, at a position short of the screw forward travel limit, for example, at a position approximately 2.56 mm short thereof according to the numerical value given at position 8 of the V-P switchover position field in the above-mentioned display screen 2. The above-mentioned V-P switchover point is not to be fixed at one point but is to be changed depending on the amount of molding material to be injected and filled, just as in the case of the prior art.

The above-mentioned time display screen 4 is arranged such that the screen is divided into a left-hand screen portion and a right-hand screen portion by the vertical axis representing the V-P switchover point;

on a left-hand screen portion 4a, the state of measured pressures $P_2$ subsequent to V-P switchover is continuously displayed, along with the state of set pressures $P_1$, as waveforms on the time scale; and on a right-hand screen portion 4b, the state of measured pressures $P_2$ prior to the initiation of V-P switchover is continuously displayed as waveforms on the time scale.

Furthermore, the time axis display screen is laterally segmented into six or so equal parts, and the setting of the time axis display screen dividing ratio can be arbitrarily changed when an operator laterally moves the vertical axis representing the V-P switchover point to an end of any of the above-mentioned six or so equal parts.

Figure 2:
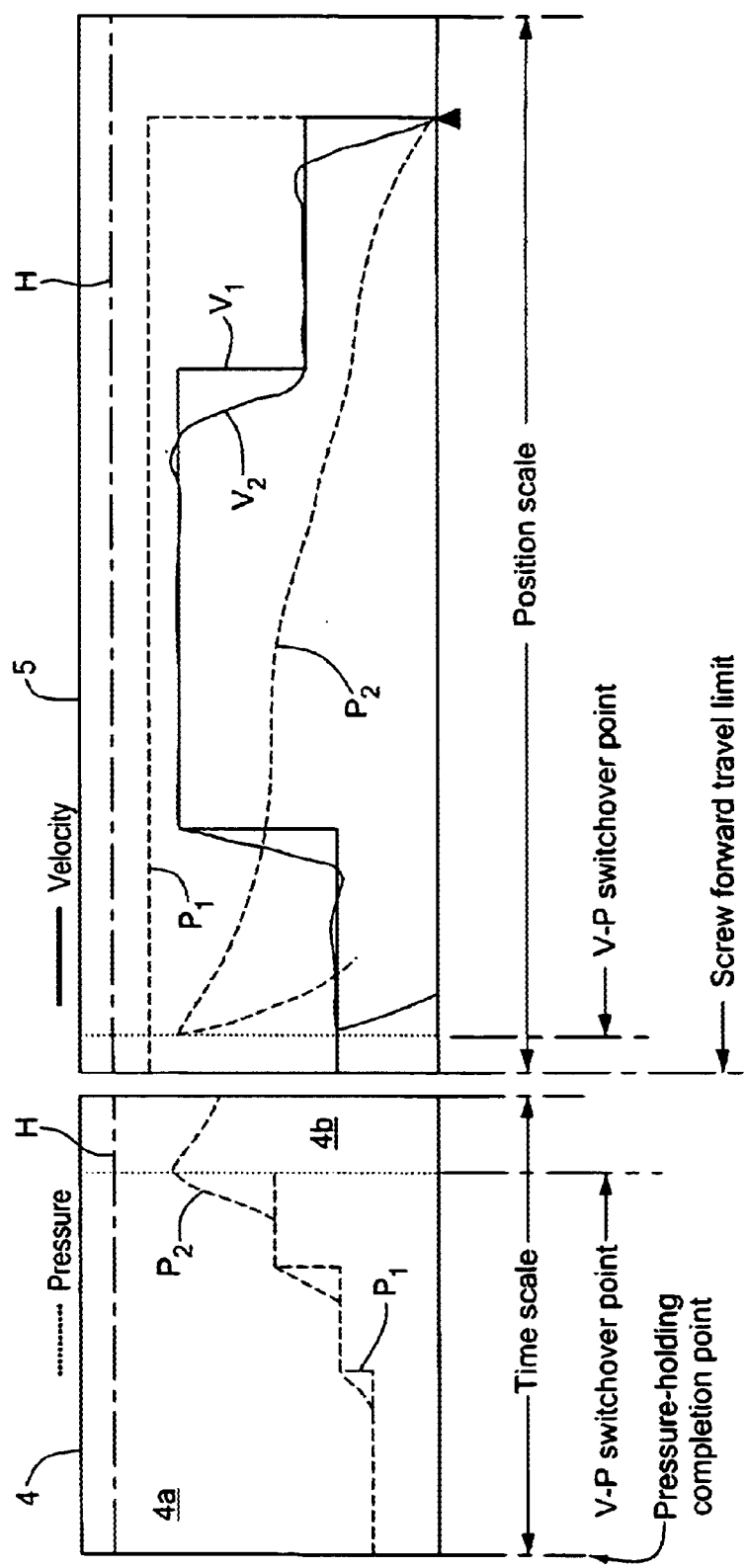
FIG. 2 a front view of the above-mentioned display screens for velocities and pressures.

In each of FIGS. 1 and 2, the ratio of the right-hand screen portion 4b, which serves as the display screen for a state prior to V-P switchover, is fixed at 1/6 to display measured pressures $P_2$ prior to V, and the ratio of the left-hand screen portion 4a, which serves as the display screen for a state subsequent to V-P switchover, is fixed at 5/6 to display not only measured pressures $P_2$ subsequent to V-P switchover but also set pressures $P_1$ subsequent to V-P switch over.

Figure 3:
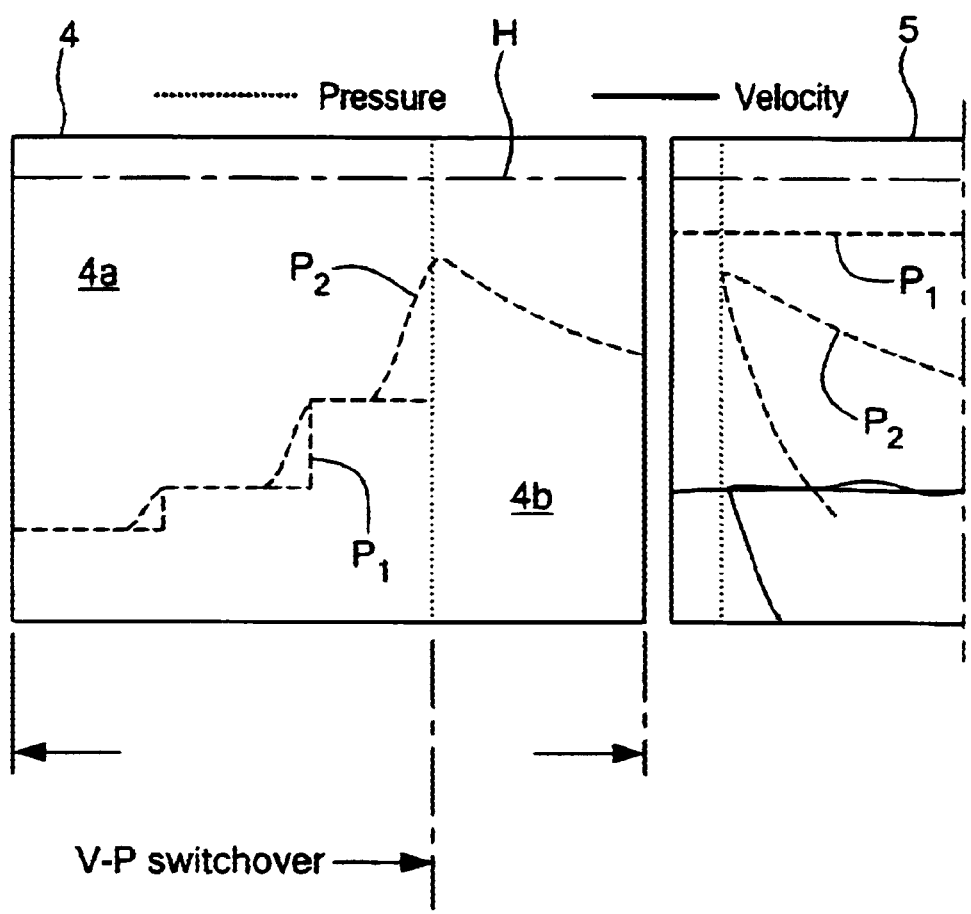
FIG. 3 a partial front view showing the result of a change in a ratio at which a time axis display screen is divided.

FIG. 3 show a case in which the ratio of the right-hand screen portion 4b is fixed at 2/6 to display measured pressures $P_2$ prior to V-P switchover, and the ratio of the left-hand screen portion 4a is fixed at 4/6 to display not only measured pressures $P_2$ subsequent to V-P switchover but also set pressures $P_1$ subsequent to V-P switchover. The change of the above-mentioned ratios causes the state of measured pressures $P_2$ prior to V-P switchover to be displayed for a longer period of time.

In the case of any of FIGS. 1, 2, and 3, measured pressures $P_2$ prior to V-P switchover as displayed on the position axis display screen 5 with respect to the forward travel of the injection screw are continuously displayed in a range prior to the V-P switchover point on the time axis display screen 4 to indicate the state of pressures as related to the lapse of time, and in addition to the above, measured pressures $P_2$ subsequent to V-P switchover are continuously displayed in a range subsequent to the V-P switchover point on the time axis display screen 4 to indicate the state of pressures as related to the lapse of time. Therefore, measured pressures $P_2$ prior to V-P switchover as displayed on the time axis display screen 4 are essentially the same as those displayed on the position axis display screen 5. Consequently, measured pressures $P_2$ as displayed on the time axis display screen 4 make it possible to ascertain the state of held pressures prior and subsequent to V-P switchover.

Furthermore, on the position axis display screen 5, velocities and/or pressures can be displayed as waveforms with respect to the position scale, just as in the case of the prior art, over an extent ranging from the V-P switchover point to the holding pressure completion point. Such being the case, the state of measured pressures $P_2$ prior and subsequent to V-P switchover can be ascertained both from the position scale and from the time scale. Therefore, an operator can ascertain any drastic variations in velocities and pressures at the V-P switchover point, and in the event that any problem arises, then the operator can immediately take remedial action such correction of molding conditions, thereby sustaining stable molding work.

What is claimed is:

1. A method of displaying velocities and pressures in a display device for injection molding comprising:

a time axis display screen for displaying filling velocities and/or pressures with a horizontal axis as a time scale during a pressure-holding process; and a position axis display screen for displaying filling velocities and/or pressures with a horizontal axis as a position scale during an injection process;

said time axis display screen and said position axis display screen being disposed side by side on a display panel surface along with fields for various numerical values established as molding conditions: wherein A V-P switchover point is displayed as a vertical axis in each of said position axis display screen and of said time axis display screen;

said time axis display screen is divided into a left-hand screen portion and a right-hand screen portion by the vertical axis representing said V-P switchover point; and the states of velocities and pressures subsequent to V-P switchover are continuously displayed as waveforms on said time axis display screen, starting at a time prior to V-P switchover.

2. A method of displaying velocities and pressures in a display device for injection molding as defined in claim 1 wherein the ratio divided at which said time axis display screen is divided by said vertical axis representing said V-P switchover point can be changed arbitrarily.

* * * * *